US011989638B2

United States Patent
Liu et al.

(10) Patent No.: US 11,989,638 B2
(45) Date of Patent: May 21, 2024

(54) CONVOLUTIONAL NEURAL NETWORK ACCELERATING DEVICE AND METHOD WITH INPUT DATA CONVERSION

(71) Applicant: THINKFORCE ELECTRONIC TECHNOLOGY CO., LTD, Shanghai (CN)

(72) Inventors: Mingrun Liu, Shanghai (CN); Liang Chen, Shanghai (CN); Xiaopeng Li, Shanghai (CN)

(73) Assignee: THINKFORCE ELECTRONIC TECHNOLOGY CO., LTD, Shanghai (CN)

( * ) Notice: Subject to any disclaimer, the term of this patent is extended or adjusted under 35 U.S.C. 154(b) by 933 days.

(21) Appl. No.: 16/977,098

(22) PCT Filed: Mar. 4, 2019

(86) PCT No.: PCT/CN2019/076839
§ 371 (c)(1),
(2) Date: Sep. 1, 2020

(87) PCT Pub. No.: WO2019/170049
PCT Pub. Date: Sep. 12, 2019

(65) Prior Publication Data
US 2021/0019594 A1    Jan. 21, 2021

(30) Foreign Application Priority Data

Mar. 6, 2018  (CN) .......................... 201810181302.1

(51) Int. Cl.
*G06N 3/04*    (2023.01)
*G06F 9/48*    (2006.01)
*G06F 13/40*   (2006.01)

(52) U.S. Cl.
CPC ............. *G06N 3/04* (2013.01); *G06F 9/4881* (2013.01); *G06F 13/4018* (2013.01)

(58) Field of Classification Search
None
See application file for complete search history.

(56) References Cited

U.S. PATENT DOCUMENTS 11,100,386 B2 *  8/2021  Barnard ............. G06F 12/0207
11,423,285 B2 *  8/2022  Barnard ............. G06F 12/0653
(Continued)

FOREIGN PATENT DOCUMENTS

CN    103218314    7/2013
CN    106504190    3/2017
(Continued)

OTHER PUBLICATIONS

Machine Translation of Chinese Patent Application CN 111008040 A, 2019. (Year: 2019).*

(Continued)

*Primary Examiner* — Steven G Snyder
(74) *Attorney, Agent, or Firm* — JCIP GLOBAL INC.

(57) ABSTRACT

Embodiments of the present invention provide an input data conversion device, comprising: a scheduling unit, to generate a control command according to the size/dimension of the input data and the size/stride of a filter, to control actions of a data moving unit and a row data expansion unit; the data moving unit, to actively read an input data from a system storage space according to the control command of the scheduling unit; a row data caching unit, to store the input data read in; and the row data expansion unit, to read one row of the input data from the row data caching unit each time, and then to expand the row of data into one row data in different filter windows according to the sizes of the filter windows.

13 Claims, 5 Drawing Sheets

(56) References Cited

U.S. PATENT DOCUMENTS

| | | | |
|---|---|---|---|
| 11,726,950 B2* | 8/2023 | Sumbul | G06F 7/5443 |
| | | | 712/36 |
| 11,741,350 B2* | 8/2023 | Huynh | G06N 3/045 |
| | | | 706/41 |
| 2016/0342893 A1 | 11/2016 | Ross et al. | |
| 2017/0235515 A1* | 8/2017 | Lea | G11C 7/1006 |
| | | | 711/105 |
| 2017/0337472 A1 | 11/2017 | Durdanovic et al. | |
| 2018/0101763 A1* | 4/2018 | Barnard | G06N 3/045 |
| 2018/0253402 A1* | 9/2018 | Redfern | G06F 17/16 |
| 2020/0034148 A1* | 1/2020 | Sumbul | G06N 3/063 |
| 2021/0158132 A1* | 5/2021 | Huynh | G06N 3/063 |
| 2021/0390368 A1* | 12/2021 | Barnard | G06F 12/0653 |
| 2022/0114116 A1* | 4/2022 | Lee | G06F 13/124 |
| 2023/0297820 A1* | 9/2023 | Mathews | G06N 3/0464 |
| | | | 708/420 |

FOREIGN PATENT DOCUMENTS

| | | | | |
|---|---|---|---|---|
| CN | 106570474 | | 4/2017 | |
| CN | 106875011 | | 6/2017 | |
| CN | 106951395 | | 7/2017 | |
| CN | 107480707 | | 12/2017 | |
| CN | 107633297 | | 1/2018 | |
| CN | 107742150 | | 2/2018 | |
| CN | 108388537 | | 8/2018 | |
| GB | 2585810 A | * | 1/2021 | G06F 12/0207 |

OTHER PUBLICATIONS

Machine Translation of Chinese Patent Application CN 110717852 B, 2019. (Year: 2019).*

"International Search Report (Form PCT/ISA/210) of PCT/CN2019/076839," dated Jun. 11, 2019, pp. 1-4.

* cited by examiner

CONVOLUTIONAL NEURAL NETWORK ACCELERATING DEVICE AND METHOD WITH INPUT DATA CONVERSION

CROSS-REFERENCE TO RELATED APPLICATION

This application is a 371 of international application of PCT application serial no. PCT/CN2019/076839, filed on Mar. 4, 2019, which claims the priority benefit of China application no. 201810181302.1, filed on Mar. 6, 2018. The entirety of each of the above mentioned patent applications is hereby incorporated by reference herein and made a part of this specification.

TECHNICAL FIELD

The invention relates to the field of convolutional neural networks, in particular to a convolutional neural network accelerating device and method.

BACKGROUND

Convolutional Neural Network (CNN) is a feed-forward neural network which has the advantages of high recognition efficiency and good rotation and scaling invariance, compared with the traditional BP neural network, and it has been widely applied in various fields such as digital image processing and face recognition.

Traditional convolution neural networks usually consist of a number of alternating convolution layers, pooling layers and the final fully connected layers. Convolutional neural network may transfer the network loss to all layers of the network by back-propagation method. The learning process of parameter updating is realized by stochastic gradient descent algorithm. The biggest difference between convolutional neural network and traditional neural network is that its convolution layer adopts a weight sharing local connected network rather than the traditional weight independent fully connected network, which makes the number of connections of convolutional neural network much less than that of traditional neural network in case of the same number of layers. The two-dimensional data structure of the convolution layer makes the convolutional neural network very suitable for processing the image data information. In addition, the introduction of the pooling layer makes the convolutional neural network have certain robustness to the geometric changes (translation, scaling, rotation, etc.) of the input data. Convolutional neural networks surpass most traditional machine vision algorithms in performance due to their powerful data feature extraction capabilities and non-linear learning capabilities. At present, convolutional neural networks have become the mainstream method in research and application fields such as image classification and target recognition.

However, image processing technologies based on convolutional neural networks, such as image recognition technology, need to use a large number of templates to perform traversal convolution operations on images in order to separate and recognize each object from a complex scene, which require a large amount of data moving and calculation, resulting in long calculation time, and therefore it is difficult to realize real-time object recognition.

Heterogeneous computing system is a computer system built-up by two kinds of architecture processors: main processor and accelerator. Different computing requirements can be satisfied by coordinating the use of processing units with different performance and structure, so as to accomplish accelerating calculations with the maximum overall performance. Therefore, heterogeneous computing provides a better idea for solving the above convolutional neural network computing problems.

The existing common heterogeneous computing systems include CPU+GPU and CPU+MIC (Many Integrated Core) to form a heterogeneous computing system. Heterogeneous computing systems may effectively obtain high-performance computing capabilities, have the advantages of good scalability, high utilization of computing resources, great development potential, etc. and has become one of the research hotspots in the field of parallel/distributed computing.

Chinese patent application CN201710641599.0 discloses a heterogeneous computing platform and an accelerating method based on the heterogeneous computing platform. In this patent application, the heterogeneous computing platform may include a host and multiple programmable devices, and the host is connected to each programmable device respectively. The host is used to initialize the programmable devices, schedule each programmable device in parallel, send calculation data for each of the programmable devices, and obtain the calculation results. Each programmable device processes its own calculation data in parallel.

After the initializing the programmable device, the host sends the calculation data for each programmable device that has been the initialized; each programmable device, after receiving the calculation data sent by the host, performs the operation in parallel, respectively, in combination with the calculation data sent to itself, to obtain the calculation results. Finally, the host obtains and saves the calculation results from each programmable device.

In the existing convolutional neural network calculations, due to the differences in design objectives and calculation performance between the host and accelerator (such as the programmable devices), the host is required to send and move the calculation data, prepare for the accelerator's calculation by performing a lot of register configurations, and then start the accelerator and be informed through interruption that the acceleration is complete, which takes a lot of host time and waiting time. In addition, after the calculation is completed, the host obtains and saves the calculation results from the internal storage of the accelerator system, which may also cause a lot of system time loss, thereby seriously affecting the calculation efficiency of the whole heterogeneous system.

For convolutional neural network calculations, the input data of each layer cannot be directly applied to the convolutional neural network, instead, the host needs to extract the corresponding two-dimensional data according to the filter window size and convert it into a serial of row array. This process requires part of the host's computing power. After the input data is processed, the amount of data will be enlarged, and the enlargement factor is determined by the size and stride of the filter window. This will lead to an increase in the bandwidth requirements of the input data, or reduce the throughput of the convolutional neural network under the same bandwidth.

In view of the problems existing in the process of convolutional neural network calculations using heterogeneous computing systems, there exists a need for a new type of convolutional neural network accelerating device and method in the art, by which the loads of the host and the bandwidth requirements are reduced.

SUMMARY OF THE INVENTION

In view of the problems existing in prior arts, in an embodiment of the present invention, an input data conversion device is provided, comprising:
- a scheduling unit, to generate a control command according to a size/dimension of an input data and a size/stride of a filter, and to control actions of a data moving unit and a row data expansion unit;
- the data moving unit, to actively read an input data from a system storage space according to the control command of the scheduling unit;
- a row data caching unit, to store the input data which is read in; and
- the row data expansion unit, to read out one row of the input data from the row data caching unit each time, and then to expand the row of the input data into one row of data in different filter windows according to the size of the filter windows.

In an embodiment of the present invention, the input data conversion device may further comprise a bit width conversion unit to convert the expanded data by the row data expansion unit into a uniform bit width, and output it to an arithmetic unit.

In an embodiment of the present invention, the row data expansion unit is a multi-channel row data expansion unit, and the multi-channel row data expansion unit expands and generates multiple channels row data in the filter windows, simultaneously.

In an embodiment of the present invention, the row data caching unit stores N rows of the input data required by the filter windows.

In an embodiment of the present invention, the row data expansion unit reads the first row of data in the N rows of input data from the row caching unit, and expands it into the corresponding row data of all filter windows; the row data expansion unit reads the next row of data from the row caching unit, and expands it into the corresponding row data of all filter windows; the row data expansion unit repeats this action until all of the N row data of the filter windows are expanded;
- the row caching unit reads the row of input data next to the N rows of the input data to replace the first row of data in the N rows of the input data as updated N rows of input data;
- the row data expansion unit expands the updated N rows of input data into all of the N row data in the filter windows.

In another embodiment of the present invention, a convolutional neural network heterogeneous computing system is provided, comprising:
- a main unit, to store an input data required to be processed by an accelerator in a system memory;
- the accelerator, comprising the input data conversion device and an arithmetic unit.

In yet another embodiment of the present invention, a convolutional neural network heterogeneous computing method is provided, comprising:
- A) reading N rows of input data required by filter windows, and storing it in a row data caching unit;
- B) reading, by a row data expansion unit, the first row of data in the N rows of data from the row data caching unit, and expanding it into the corresponding row data of all filter windows;
- C) reading, by a row data expansion unit, the next row of data from the row data caching unit, and expanding it into the corresponding row data of all filter windows, repeating step C) until all of the N row data of the filter windows are expanded;
- D) reading the row of the input data next to the N rows of the input data into row data caching unit to replace the first row of data in the N rows of input data as updated N rows of input data;
- E) repeating step B) and C), to expand the updated N rows of input data into all of the N row data in filter windows.

In a further embodiment of the present invention, all of the N row data in filter windows are converted by a bit width conversion unit into a uniform bit width, and output it to an arithmetic unit.

In a further embodiment of the present invention, the input data has multiple dimensions, and for each dimension, steps A) to C) are repeated before step D), to generate the data required by the filter windows.

In a further embodiment of the present invention, steps D) and E) are repeated to expand into all of row data of the filter windows in the input data.

In a further embodiment of the present invention, before step A), one or more rows of zeros are added before the first row of the input data and one or more rows of zeros are added after the last row of the input data.

Through the input data conversion device and method disclosed in the present invention, the accelerator of the heterogeneous computing system can complete the data preprocessing of the convolutional neural network by itself, thereby reducing the computing power requirement of the main unit. The input data conversion device and method disclosed in the present invention may make full use of the spatial correlation of the input data of different filter windows, reduce the amount of data moved by the convolutional neural network to the theoretical limit, thereby reducing the requirement on the memory bandwidth. In addition, in the convolution calculation process, data moving is initiated entirely by the accelerator, thereby reducing the load on the main unit.

DESCRIPTION OF DRAWINGS

In order to further clarify the above and other advantages and features of the embodiments of the present invention, a more specific description of various embodiments of the present invention will be presented with reference to the accompanying drawings. It can be understood that these drawings only depict typical embodiments of the present invention and therefore should not be considered as a limitation of its scope. In the drawings, the same or corresponding parts will be indicated by the same or similar marks for the sake of clarity.

DETAILED DESCRIPTION

Figure 1:
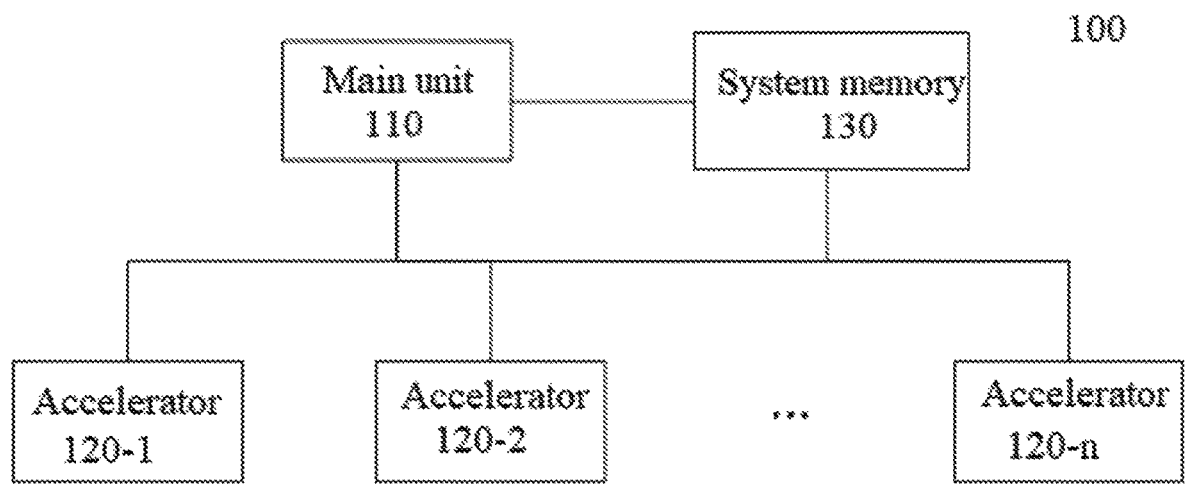
FIG. 1 shows a block diagram of a heterogeneous computing system 100 according to some embodiments of the invention.

In the following description, the present invention will be described with reference to various embodiments. However, those skilled in the art will recognize that the various embodiments can be implemented without one or more specific details or with other alternative and/or additional methods, materials or components. In other cases, well-known structures, materials or operations are not shown or described in detail so as not to obscure aspects of the various embodiments of the present invention. Similarly, for purposes of explanation, specific quantities, materials, and configurations are set forth in order to provide a thorough understanding of the embodiments of the present invention. However, the present invention can be implemented without specific details. In addition, it should be understood that the various embodiments shown in the drawings are illustrative representations and are not necessarily drawn to scale.

In the present description, reference to "one embodiment" or "the embodiment" means that a specific feature, structure, or characteristic described in connection with the embodiment is included in at least one embodiment of the present invention. The appearances of the phrase "in one embodiment" in various places in the present description do not necessarily all refer to the same embodiment.

It should be noted that the embodiment of the invention describes the steps in a specific order. However, this is only for the convenience of distinguishing the steps, rather than limiting the sequence of the steps. In different embodiments of the invention, the sequence of each step can be adjusted according to the adjustment of the specific process.

The embodiments of the present invention provide a neural network heterogeneous accelerating method and system based on asynchronous events. Through the solution disclosed in the embodiment of the present invention, it may be avoided that the main CPU moves data actively and designates operations actively during each operation, thereby reducing a large amount of effective calculation time of the main CPU wasted by this part of the operation. Through this solution, the calculation efficiency of the main CPU will be improved, thereby realizing an efficient heterogeneous computing mode.

Convolution calculation can be regarded as a process of weighted summation, where each pixel in the image area is multiplied by each element of the filter (i.e., weight matrix), and the sum of all products is used as the new value of the center pixel of the area.

The filter is the weight used in convolution, which is represented by a matrix, and which has the same size as the corresponding image area, and its rows and columns are odd number, that is, it is a weight matrix.

Example of Convolution Calculation:
Convolution calculation of 3*3 pixel area R and filter G:
If R is a 3*3 pixel area, and the filter is G:

$$R = \begin{bmatrix} R1 & R2 & R3 \\ R4 & R5 & R6 \\ R7 & R8 & R9 \end{bmatrix}$$

-continued $$G = \begin{bmatrix} G1 & G2 & G3 \\ G4 & G5 & G6 \\ G7 & G8 & G9 \end{bmatrix}$$

convolution sum=R1G1+R2G2+R3G3+R4G4+R5G5+ R6G6+R7G7+R8G8+R9G9.

In the embodiment of the present invention, the convolution operation is completed by a heterogeneous computing system. FIG. 1 shows a block diagram of a heterogeneous computing system 100 according to some embodiments of the invention. In the embodiment shown in FIG. 1, the heterogeneous computing system 100 includes a main unit 110, one or more accelerators 120-1 . . . 120-n, and a system memory 130. In the following, in order to simplify the description of this specification, one or more accelerators 120-1 . . . 120-n are referred to as accelerator 120 for short.

In the embodiment of the invention, the main unit 110 may be one or more main central processing units (CPUs) or one or more cores of a multi-core CPU, wherein the CPU may include a logic arithmetic unit, a control unit, a storage unit, etc.

Accelerator 120 may be one or more main central processing units (CPUs), one or more graphics processing units (GPUs), one or more digital signal processors (DSPs), one or more many integrated cores (MICs), one or more field programmable gate arrays (FPGAs), and/or dedicated hardware for performing a certain function, etc. Dedicated hardware for specific functions may be a customized hardware to speed up specific types of calculations.

In some embodiments, the main unit 110 and the accelerator 120 may be on the same hardware, such as each being a part of cores of the same multi-core computing hardware, or fully integrated into the relatively independent computing modules in a system-on-chip (SoC) platform, etc. The main unit 110 and the accelerator 120 communicate with each other and with the system memory through interconnection. In other embodiments, the main unit 110 and the accelerator 120 may be distributed in different geographic locations and communicate through a wired or wireless network. For example, the main unit 110 and the accelerator 120 may communicate by way of sharing system memory, and the system connection may be accomplished just by the bus supporting the DMA mode. The connection of the shared system memory can be an off-chip PCIE bus structure, a CAPI bus structure, various on-chip system interconnections such as AMBA, OCP bus, etc.

In other embodiments of the present invention, the main unit 110 and the accelerator 120 may not be a physical hardware structure, but one or more virtual machines in a virtual architecture. For example, the main unit 110 may be a main VM, and the accelerator 120 may be one or more guest VMs.

In the process of convolutional calculations, the input data of each layer cannot be applied to the convolutional neural network, directly, instead, the corresponding two-dimensional data should be extracted according to the size of the filter window and converted into a serial of row array. After the input data is processed, the amount of data will be enlarged, and the enlargement factor is determined by the size and stride of the filter window.

Figure 2:
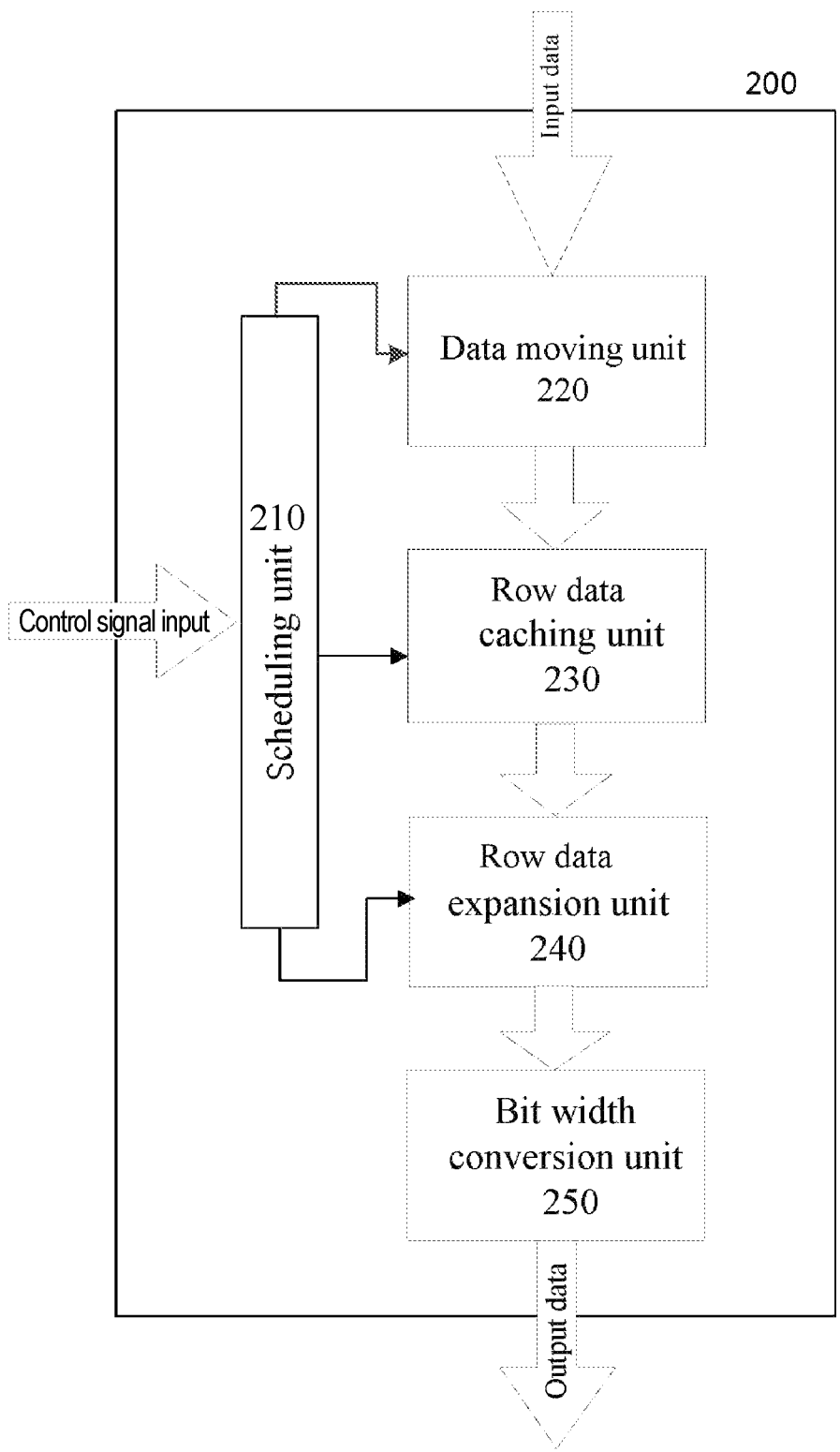
FIG. 2 shows a block diagram of an input data conversion device 200 according to some embodiments of the present invention.

In the process of convolutional neural network operations performed by a heterogeneous computing system, in order to reduce the loads of the main unit, the present invention provides an integrated circuit that may convert the original input data of each layer to be used by the convolutional neural network directly. FIG. 2 shows a block diagram of an input data conversion device 200 according to some embodiments of the present invention. The input data conversion device 200 may be incorporated in an accelerator. As shown in FIG. 2, the input data conversion device 200 may include a scheduling unit 210, a data moving unit 220, a row data caching unit 230, and a row data expansion unit 240.

The scheduling unit 210 may generate a control command according to the size/dimension of the input data and the size/stride of a filter, to control actions of the data moving unit 220 and the row data expansion unit 240.

The data moving unit 220 may actively read an input data from a system storage space according to the control command of the scheduling unit 210.

The row data caching unit 230 may be used to temporarily store the original input data that is read in and mark the tail of each row.

The row data expansion unit 240 may read out one row of the input data from the row data caching unit 230 each time, and then expand the row of data into one row data in different filter windows according to the sizes of the filter windows. In order to increase the data bandwidth, the row data expansion unit 240 can expand and generate the data of multiple filter windows simultaneously.

Since the convolution sizes of different layers of the convolutional neural network may be different, the effective bit width of the row data output by the row data expansion unit 240 may also change accordingly. The input data conversion device 200 may further comprise a bit width conversion unit 250, which converts different bit widths of row data into a uniform data bit width for use by subsequent arithmetic units.

Figure 3:
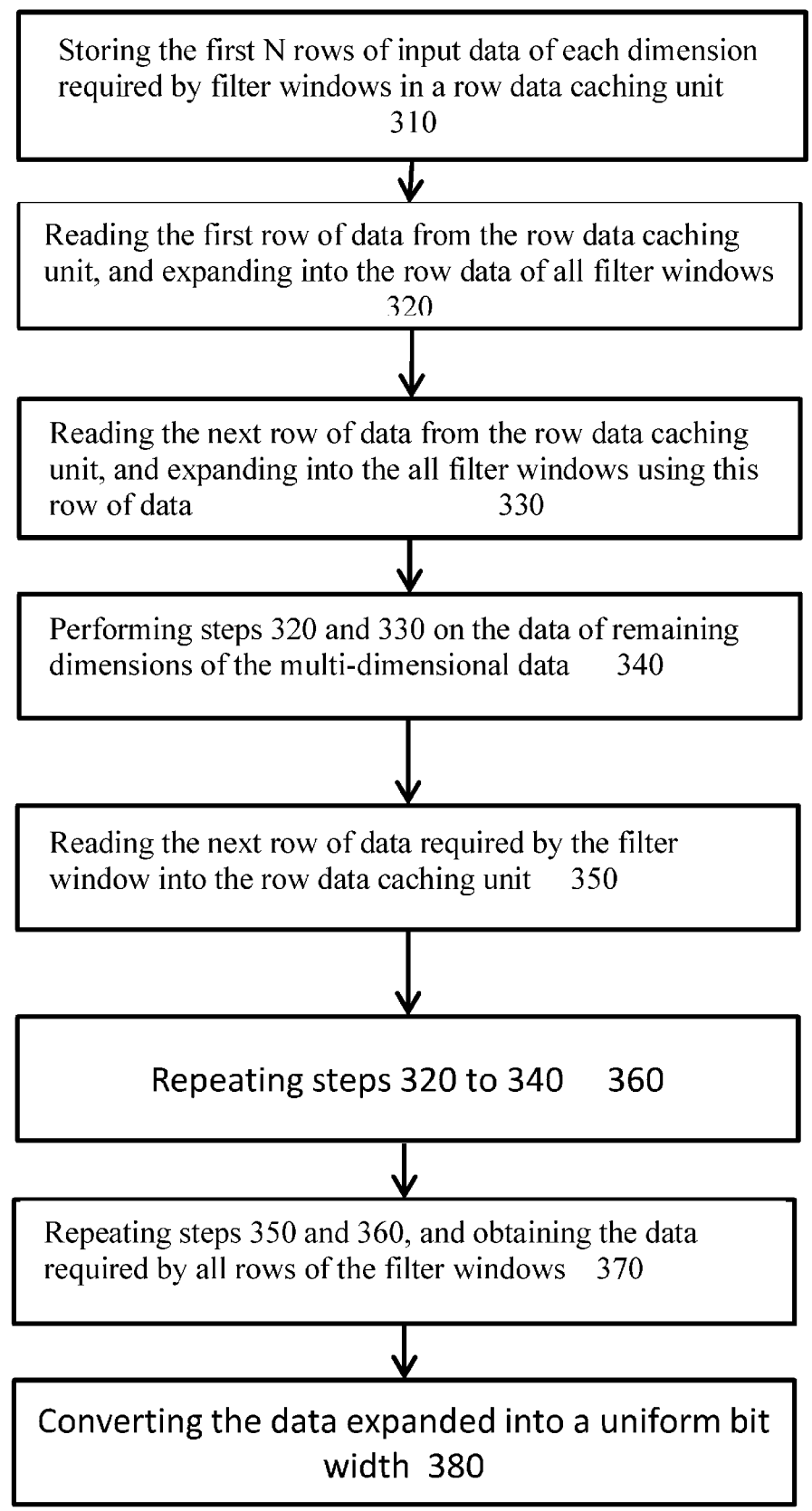
FIG. 3 shows a flowchart of an input data conversion process according to some embodiments of the present invention.

In the following, taking a filter window with a size of 3×3, a stride of 1, and input data with a size of 224×224 and a dimension of 3 as example, the steps of the input data conversion process of the present invention will be described in connection with FIG. 3. FIG. 3 shows a flowchart of an input data conversion process according to some embodiments of the present invention.

Figure 4:
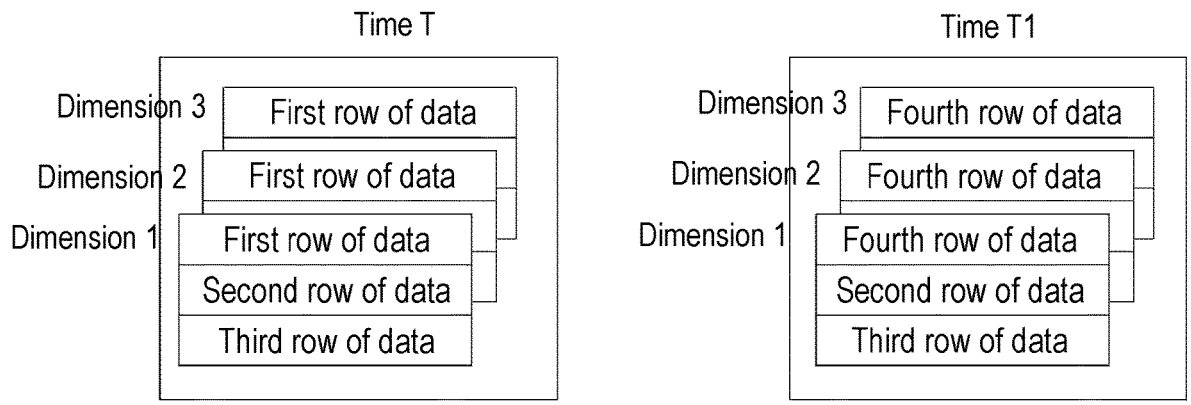
FIG. 4 shows a schematic diagram of a row data caching unit 400 according to an embodiment of the present invention.

First, in step 310, first N rows of input data of each dimension required by filter windows may be read and stored in a row data caching unit 230. For example, since the size of the filter window is 3×3, the first row of the filter window requires the first 3 rows of input data in each dimension. FIG. 4 shows a schematic diagram of a row data caching unit 400 according to an embodiment of the present invention. As shown in FIG. 4, at time T, the input data of the first 3 rows of each dimension is stored in the row data caching unit 400. The corresponding amount of input data may be read by the data moving unit 220 from a system storage space according to the control command of the scheduling unit, and stored in the row data caching unit 230.

Figure 5:
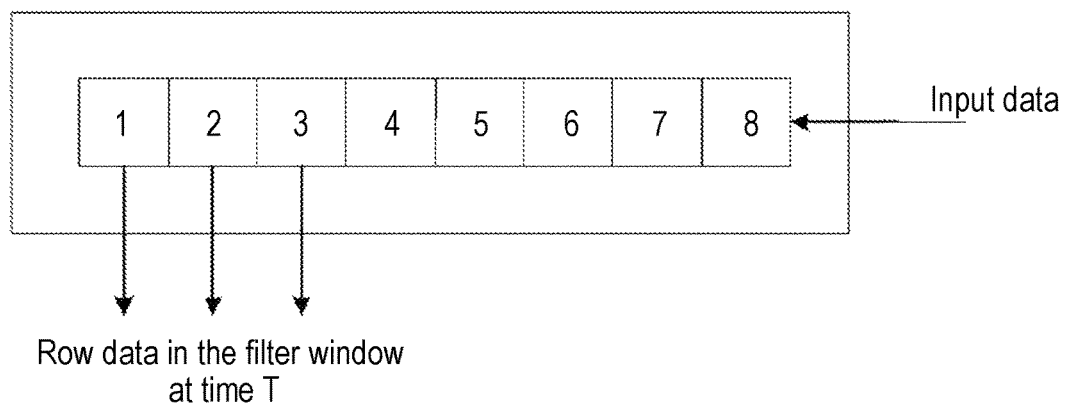
FIG. 5 shows a schematic diagram of a single-channel row data expansion unit according to an embodiment of the present invention.
Figure 5:
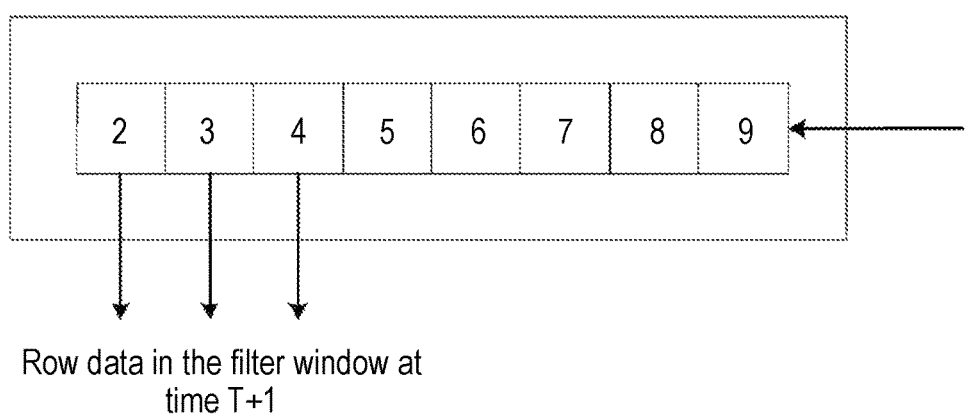

Next, in step 320, by the row data expansion unit 240, the first row of data may be read from the row data caching unit 230, and expanded into the row data of all filter windows. For example, the row data expansion unit 240 may read the first row of data from the row data caching unit 230, and expand it into the first row of data in the first, second, and up to the 224th filter window, sequentially. FIG. 5 shows a schematic diagram of a single-channel row data expansion unit according to an embodiment of the present invention. As shown in FIG. 5, assuming that the caching space of the single-channel row data expansion unit is 8, the inputted row data is 1, 2, 3, 4, 5, 6, 7, 8, and at time T, the single-channel row data expansion unit expands and generates the row data 1, 2, 3 in the filter window; at time T+1, one bit is moved to the left in the inputted row data to be 2, 3, 4, 5, 6, 7, 8, 9, and the single-channel row data expansion unit expands and generates the row data 2, 3, 4 in the filter window.

Figure 6:
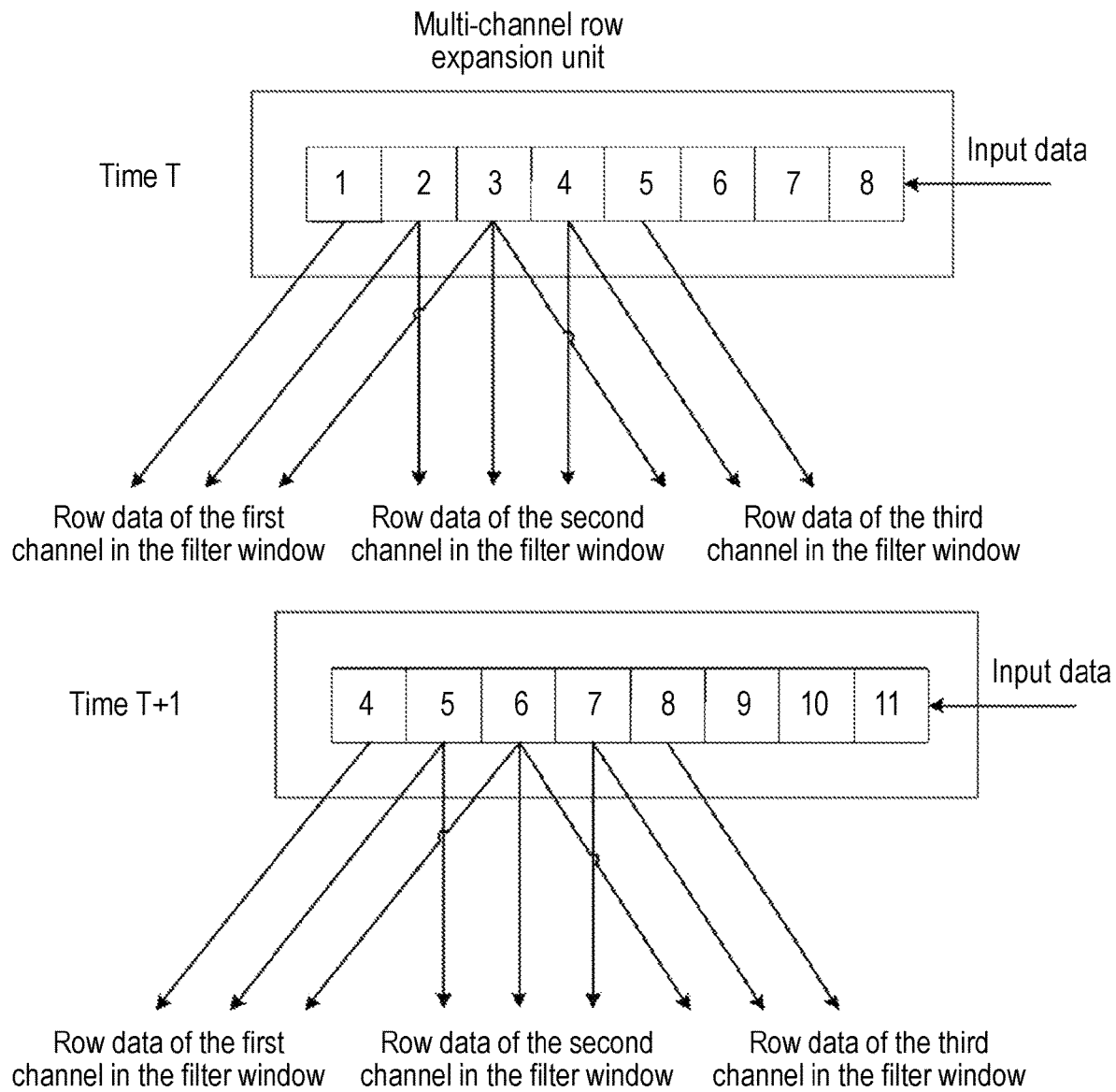
FIG. 6 shows a schematic diagram of a multi-channel row data expansion unit according to an embodiment of the present invention.

In order to improve the calculation efficiency, in another embodiment of the invention, a multi-channel row data expansion unit may be used. FIG. 6 shows a schematic diagram of a multi-channel row data expansion unit according to an embodiment of the present invention. As shown in FIG. 6, assuming that the caching space of the multi-channel row data expansion unit is 8, the inputted row data is 1, 2, 3, 4, 5, 6, 7, 8, and at time T, the multi-channel row data expansion unit may first expand and generate three channels of row data in the filter window, that is, the row data 1, 2, 3 in the first channel of the filter window, the row data 2, 3, 4 in the second channel of the filter window, the row data 3, 4, 5 in the third channel of the filter window; at time T+1, three bits are moved to the left in the inputted row data to be 4, 5, 6, 7, 8, 9, 10, 11, and the multi-channel row data expansion unit may expand and generate the subsequent three row data in the filter window, that is, the row data 4, 5, 6 in the first channel of the filter window, the row data 5, 6, 7 in the second channel of the filter window, and the row data 6, 7, 8 in the third channel of the filter window.

Those skilled in the art may understand that the row data expansion unit shown in FIG. 5 and FIG. 6 is only an exemplary embodiment of the present invention, and row data expansion units 240 of other cache space sizes and expansion methods should also be included in the protection scope of the present invention.

After the data of the first row is read, the storage space of the corresponding row data caching unit 230 may be released for use for subsequent data. For example, as shown in FIG. 4, after the first row of data is read, at time T1, the fourth row of data is stored in the location originally used to store the first row of data.

Next, in step 330, the next row of data may be read by the row data expansion unit 240 from the row data caching unit 230, and expanded into the data of all filter windows using this row of data. For example, the row data expansion unit 240 may read the second row of data from the row data caching unit 230, and expand into the second row of data in the first, second, and up to the 224th filter window, sequentially. Repeat this step until all 3 row data in the filter windows on dimension 1 are obtained.

In step 340, steps 320 and 330 are performed on the data of the remaining dimensions of the multi-dimensional data by the row data expansion unit 240 to generate the data required by all the filter windows. For example, the row data expansion unit 240 sequentially repeats steps 320 and 330 on the data of dimension 2 and dimension 3, and generates the data required by all the filter windows.

In step 350, the next row of data required by the filter window is read into the row data caching unit 230. For example, the second row of all the filter windows may require the second to fourth rows of data in the original image, where the second to third rows of data have already been stored in the row data caching unit 230, so only the fourth row of data in each dimension is required to be read and stored in the space where the first row of data is located originally, to reduce the size of the storage unit. For example, as shown in FIG. 4, after the first row of data is read, at time T1, the fourth row of data is stored in the location originally used to store the first row of data.

In step 360, steps 320 to 340 are repeated to expand and generate the data of all filter windows in the second line.

In step 370, steps 350 and 360 are repeated until the data required by all rows of the filter windows is obtained. For example, in some embodiments of the present invention, when the size of the filter window is 3×3, and when the filter traverses to the next-to-last row of data, the filter window will exceed the image range. In order to avoid reducing the size of convolution data relative to the original data, zeros may be added to the original data. For example, one row of zeros may be added in front of the first row of the original data and one row of zeros may be added behind the last row of the original data. In other embodiments of the present invention, multiple rows of zeros may be added in front of the first row of the original data, behind the last row of the original data, to the left of the first column, and/or to the right of the last column.

Optionally, the input data conversion process disclosed in the present invention may further comprise step 380. In step 380, the data expanded by the row data expansion unit 240 is converted into a uniform bit width by the bit width conversion unit 250, and output to the arithmetic unit.

The above embodiments describe the present invention by taking filter window with size of 3×3, stride of 1, and input data with size of 224×224 and dimension of 3 as example. However, those skilled in the art should appreciate that the above specific values are only used for the purpose of illustration, so they should not be considered as a limitation. The devices and methods disclosed in the invention can be applied to filters with various sizes and stride as well as input data with various sizes and dimensions.

Through the input data conversion device and method disclosed in the present invention, the accelerator of the heterogeneous computing system can complete the data preprocessing of the convolutional neural network by itself, thus reducing the computing power requirement of the main unit.

The input data conversion device and method disclosed in the present invention may make full use of the spatial correlation of the input data of different filter windows, and reduce the amount of data moved by the convolutional neural network to the theoretical limit, thereby reducing the requirement on the memory bandwidth.

In addition, in the convolution calculation process, data moving is initiated entirely by the accelerator, thereby reducing the load on the main unit.

Although the various embodiments of the present invention have been described above, it should be understood that they are presented only as examples and not as limitations. It is obvious to those skilled in the relevant art that various combinations, modifications and changes can be made to the various embodiments without departing from the spirit and scope of the present invention. Therefore, the breadth and scope of the present invention disclosed herein should not be limited by the exemplary embodiments disclosed above, but should be defined only in accordance with the appended claims and their equivalents.

What is claimed is:

1. An input data conversion device, comprising:
a scheduling unit, to generate a control command according to a size/dimension of an input data and a size/stride of a filter, and to control actions of a data moving unit and a row data expansion unit;
the data moving unit, to actively read an input data from a system storage space according to the control command of the scheduling unit;
a row data caching unit, to store the input data that is read in; and
the row data expansion unit, to read out one row of the input data from the row data caching unit each time, and then to expand the row of the input data into one row of data in different filter windows according to the sizes of the filter windows, wherein the row data expansion unit is a multi-channel row data expansion unit, and the multi-channel row data expansion unit expands and generates a plurality of channels of row data in the filter windows, simultaneously.

2. The input data conversion device of claim 1, further comprising a bit width conversion unit to convert the expanded data by the row data expansion unit into a uniform bit width, and output it to an arithmetic unit.

3. The input data conversion device of claim 1, wherein the row data caching unit stores N rows of the input data required by the filter windows, and N is a positive integer and determined according to the sizes of the filter windows.

4. The input data conversion device of claim 3, wherein the row data expansion unit reads a first row of data in the N rows of the input data from the row data caching unit, and expands it into corresponding row data of all filter windows; the row data expansion unit reads a next row of data from the row data caching unit, and expands it into corresponding row data of all filter windows; the row data expansion unit repeats this action until all of the N row data in the filter windows are expanded;
the row data caching unit reads a row of the input data next to the N rows of the input data to replace the first row of data in the N rows of the input data as updated N rows of the input data;
for the updated N lines of input data, the row data expansion unit reads the replaced row of data, expands it into corresponding row data of all filter windows, and stores it in a space where the corresponding row data resides before replaced, thereby all of updated N row data in the filter windows being expanded.

5. A convolutional neural network heterogeneous computing system, comprising:
a main unit, to store an input data required to be processed by an accelerator in a system memory;
the accelerator comprising the input data conversion device of claim 1 and an arithmetic unit.

6. A convolutional neural network heterogeneous computing method, comprising:
A) reading N rows of input data required by filter windows, and storing it in a row data caching unit, wherein N is a positive integer and determined according to the sizes of the filter windows;
B) reading, by a row data expansion unit, a first row of data in the N rows of input data from the row data caching unit, and expanding it into row data of all filter windows, wherein the row data expansion unit is a multi-channel row data expansion unit, and the multi-channel row data expansion unit expands and generates a plurality of channels of row data in the filter windows, simultaneously;
C) reading, by the row data expansion unit, a next row of data from the row data caching unit, and expanding it into the row data of all filter windows, repeating step C) until all of the N row data of the filter windows are expanded;
D) reading a row of the input data next to the N rows of the input data into the row data caching unit to replace the first row of data in the N rows of the input data as updated N rows of the input data;
E) repeating step B) and C), to expand the updated N rows of the input data into all of the N row data in filter windows.

7. The method of claim 6, wherein all the N row data in filter windows are converted by a bit width conversion unit into a uniform bit width, and output to an arithmetic unit.

8. The method of claim 6, wherein the input data has multiple dimensions, and for each dimension, steps A) to C) are repeated before step D), to generate data required by the filter windows.

9. The method of claim 6, wherein steps D) and E) are repeated to expand and generate all of row data of the filter windows in the input data.

10. The method of claim 6, wherein before step A), one or more rows of zeros are added before the first row of the input data and one or more rows of zeros are added after a last row of the input data.

11. The convolutional neural network heterogeneous computing system of claim 5, wherein the input data conversion device further comprises a bit width conversion unit to convert the expanded data by the row data expansion unit into a uniform bit width, and output it to an arithmetic unit.

12. The convolutional neural network heterogeneous computing system of claim 5, wherein the row data caching unit stores N rows of the input data required by the filter windows.

13. The convolutional neural network heterogeneous computing system of claim 12, wherein the row data expansion unit reads a first row of data in the N rows of the input data from the row data caching unit, and expands it into corresponding row data of all filter windows; the row data expansion unit reads a next row of data from the row data caching unit, and expands it into corresponding row data of all filter windows; the row data expansion unit repeats this action until all of the N row data in the filter windows are expanded;

the row data caching unit reads a row of the input data next to the N rows of the input data to replace the first row of data in the N rows of the input data as updated N rows of the input data;

for the updated N lines of input data, the row data expansion unit reads the replaced row of data, expands it into corresponding row data of all filter windows, and stores it in a space where the corresponding row data resides before replaced, thereby all of updated N row data in the filter windows being expanded.

* * * * *